(12) United States Patent
Bogoslofski et al.

(10) Patent No.: US 9,505,353 B2
(45) Date of Patent: Nov. 29, 2016

(54) CARRIER MOUNT

(75) Inventors: Kevin Bogoslofski, Southington, CT (US); Robert H. Humphries, Jr., Danbury, CT (US); Greg Weaver, Waterbury, CT (US); John Laverack, Southbury, CT (US)

(73) Assignee: Thule Sweden AB, Hillerstorp (SE)

( * ) Notice: Subject to any disclaimer, the term of this patent is extended or adjusted under 35 U.S.C. 154(b) by 944 days.

(21) Appl. No.: 13/811,972

(22) PCT Filed: Jul. 29, 2011

(86) PCT No.: PCT/US2011/045965
§ 371 (c)(1),
(2), (4) Date: Jun. 5, 2013

(87) PCT Pub. No.: WO2012/018693
PCT Pub. Date: Feb. 9, 2012

(65) Prior Publication Data
US 2013/0270412 A1     Oct. 17, 2013

Related U.S. Application Data

(60) Provisional application No. 61/369,745, filed on Aug. 1, 2010.

(51) Int. Cl.
*B60R 9/048* (2006.01)
*E05B 65/00* (2006.01)

(52) U.S. Cl.
CPC .............. *B60R 9/048* (2013.01); *E05B 65/00* (2013.01); *Y10T 29/4984* (2015.01); *Y10T 70/7559* (2015.04)

(58) Field of Classification Search
CPC ..................................................... B60R 9/048
USPC ..................................... 224/315, 324; 70/18
See application file for complete search history.

(56) References Cited

U.S. PATENT DOCUMENTS

| 4,369,009 A | * | 1/1983 | Fulford | ........... B60R 9/048 224/324 |
| 4,724,692 A | * | 2/1988 | Turin | ............. B62H 5/001 70/204 |

(Continued)

FOREIGN PATENT DOCUMENTS

| EP | 0588409 A1 | 3/1994 |
| WO | 9531625 A1 | 11/1995 |
| WO | 2012018693 A1 | 9/2012 |

OTHER PUBLICATIONS

International Searching Authority, International Search Report and Written Opinion for International Application No. PCT/US2011/045965, dated Dec. 19, 2011.

(Continued)

*Primary Examiner* — Justin Larson
(74) *Attorney, Agent, or Firm* — Sterne, Kessler, Goldstein & Fox P.L.L.C.

(57) ABSTRACT

A lockable carrier mount including a main body, an actuating mechanism and interference locking member, and a securement member. The actuating mechanism is configurable between locked and released configurations. The actuating mechanism includes rotatable actuator having a blocking portion with at least one protrusion extending radially further from a rotational axis of the actuator than other parts of the blocking portion. The interference locking member is coupled to the main body and has an engagement surface for selectively engaging the blocking portion. The engagement surface can abut the protrusion in the locked configuration to prevent rotation of the actuator relative to the locking member. The securement member is operably coupled to the actuating mechanism and configured to move toward a secured configuration when the actuator is rotated in one direction and move toward a released configuration when the actuator is rotated in an opposite direction.

17 Claims, 7 Drawing Sheets

(56) References Cited

U.S. PATENT DOCUMENTS

| | | | | |
|---|---|---|---|---|
| 4,765,521 A * | 8/1988 | Finnegan | B60R 9/048 | 224/315 |
| 4,848,112 A * | 7/1989 | Graber | F16B 41/005 | 224/315 |
| 5,443,190 A * | 8/1995 | Cucheran | B60R 9/00 | 224/309 |
| 5,598,959 A * | 2/1997 | Lorensen | B60R 9/045 | 224/315 |
| 5,791,170 A * | 8/1998 | Officer | E05B 67/003 | 70/14 |
| 6,283,310 B1 * | 9/2001 | Dean | B60R 9/048 | 211/17 |
| 6,322,279 B1 * | 11/2001 | Yamamoto | B60R 9/045 | 224/324 |
| 6,494,351 B1 * | 12/2002 | Dean | B60R 9/048 | 224/324 |
| 6,865,914 B2 * | 3/2005 | Irgens | B60D 1/06 | 70/14 |
| 7,234,617 B2 * | 6/2007 | Weaver | B60R 9/048 | 224/315 |
| 7,434,425 B2 * | 10/2008 | Mahre | A63B 55/00 | 206/315.2 |
| 7,520,709 B2 * | 4/2009 | Wang | F16B 41/005 | 411/396 |
| 8,020,737 B2 * | 9/2011 | Sweeney | B60R 9/048 | 224/319 |
| 8,234,757 B2 * | 8/2012 | Lesley | A44B 11/16 | 24/170 |
| 8,496,145 B2 * | 7/2013 | Sautter | B60R 9/045 | 224/315 |
| 8,556,555 B2 * | 10/2013 | Lesley | B60P 7/0838 | 410/100 |
| 8,701,452 B2 * | 4/2014 | Foster | E05B 73/0082 | 248/316.1 |
| 2006/0255081 A1 * | 11/2006 | Weaver | B60R 9/048 | 224/324 |
| 2007/0164065 A1 * | 7/2007 | Davis | B60R 9/10 | 224/324 |
| 2011/0132946 A1 * | 6/2011 | Sautter | B60R 9/045 | 224/324 |
| 2011/0139841 A1 * | 6/2011 | Sautter | B60R 9/045 | 224/324 |
| 2013/0270412 A1 * | 10/2013 | Bogoslofski | B60R 9/048 | 248/551 |
| 2014/0166710 A1 * | 6/2014 | Sautter | B60R 9/045 | 224/324 |
| 2015/0026935 A1 * | 1/2015 | Prescott | B65D 63/16 | 24/593.11 |

OTHER PUBLICATIONS

Office Action mailed Dec. 17, 2014; in corresponding Chinese patent application No. 201180038016.6.

English translation of the Office Action mailed Dec. 17, 2014; in corresponding Chinese patent application No. 201180038016.6.

* cited by examiner

CARRIER MOUNT

CROSS-REFERENCE TO RELATED APPLICATION

This application claims the benefit of U.S. Provisional Application No. 61/369,745, entitled Carrier Mount and filed on Aug. 1, 2010, the disclosure of which is hereby expressly incorporated herein by reference, in its entirety.

FIELD OF THE TECHNOLOGY

The present technology relates to equipment transport systems that can be mounted, for example, to the top of a vehicle to carry luggage, sporting equipment such as bicycles, kayaks, or surfboards, and the like. More particularly, the present technology relates to mounting arrangements used to interchangeably attach different equipment-specific carriers to a vehicle's load bars (cross bars), that extend from one side of the vehicle to the other, and that are often attached to the vehicle's luggage rails.

BACKGROUND OF THE TECHNOLOGY

Equipment transport systems are generally well known and are used to transport equipment on the roof of a vehicle such as a passenger car or SUV. While the present disclosure primarily relates to connection mechanisms for attaching different things to a load carrier's cross bar, similar connectors are otherwise utilized in load carriers for different purposes. As an example, the load bars themselves are often attached between luggage rails running longitudinally along either side of the vehicle's roof (with the load bars extending across the vehicle's roof from one side to the other) using carrier mounts or "railing feet" that can be similar in configuration to the mountings described herein.

One such related, but different rail mounting device is known as the THULE 450 railing foot which has a body member and a strap that extends from one end of the body member to the other end, with the strap located below the body member in terms of the operational orientation of the foot. The foot is secured to one of the luggage rails by releasing an end of the strap, placing the body member on top of the luggage rail, passing the strap beneath the luggage rail and reattaching the released end to the body member. The strap is then cinched up to take up any slack which secures the railing foot to the luggage rail. A top end of the THULE 450 railing foot is configured to releasably connect to an end of the cross-bar so that with a railing foot at each end of the cross-bar, the bar can be connected to opposite rails, across the top of the vehicle.

BRIEF DESCRIPTION OF THE DRAWINGS

Embodiments of the present technology will now be described in greater detail in connection with the drawings, in which.

DESCRIPTION

Figure 1:
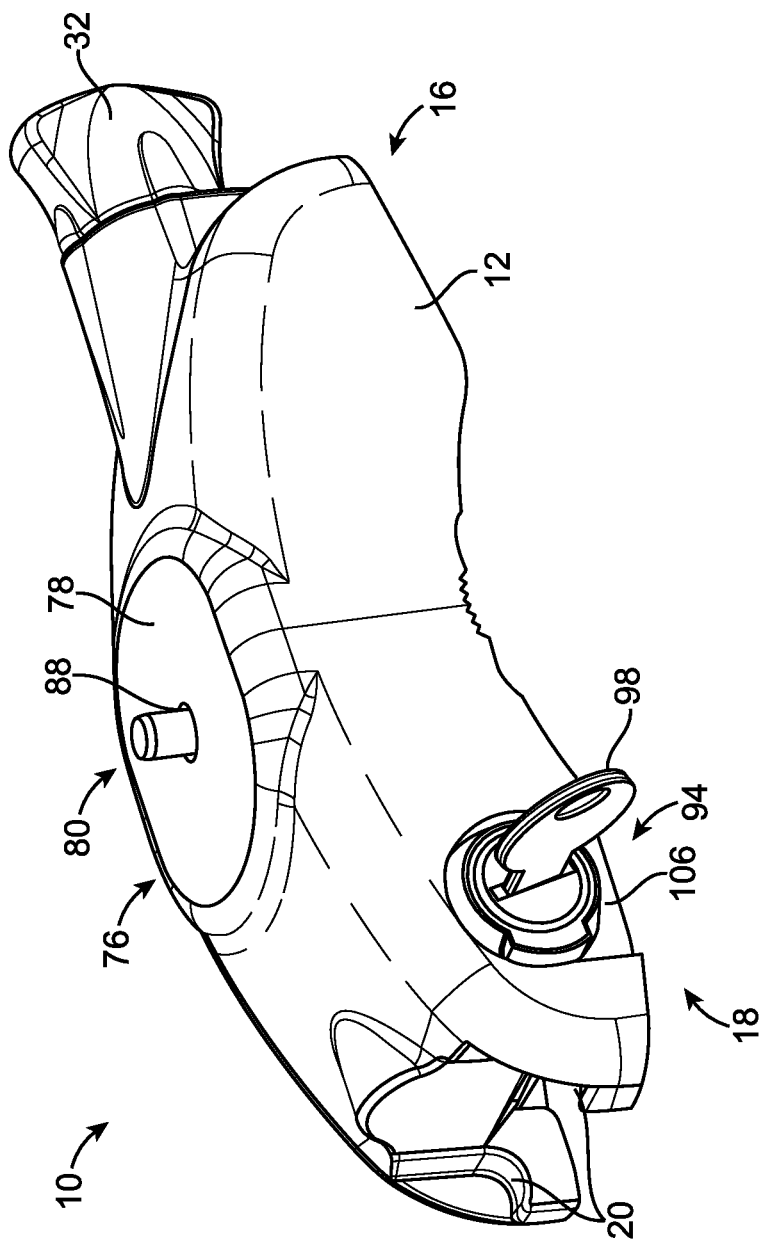
FIGS. 1 and 2 are perspective views, from slightly different angles, of a carrier mount according to the present technology.
Figure 2:
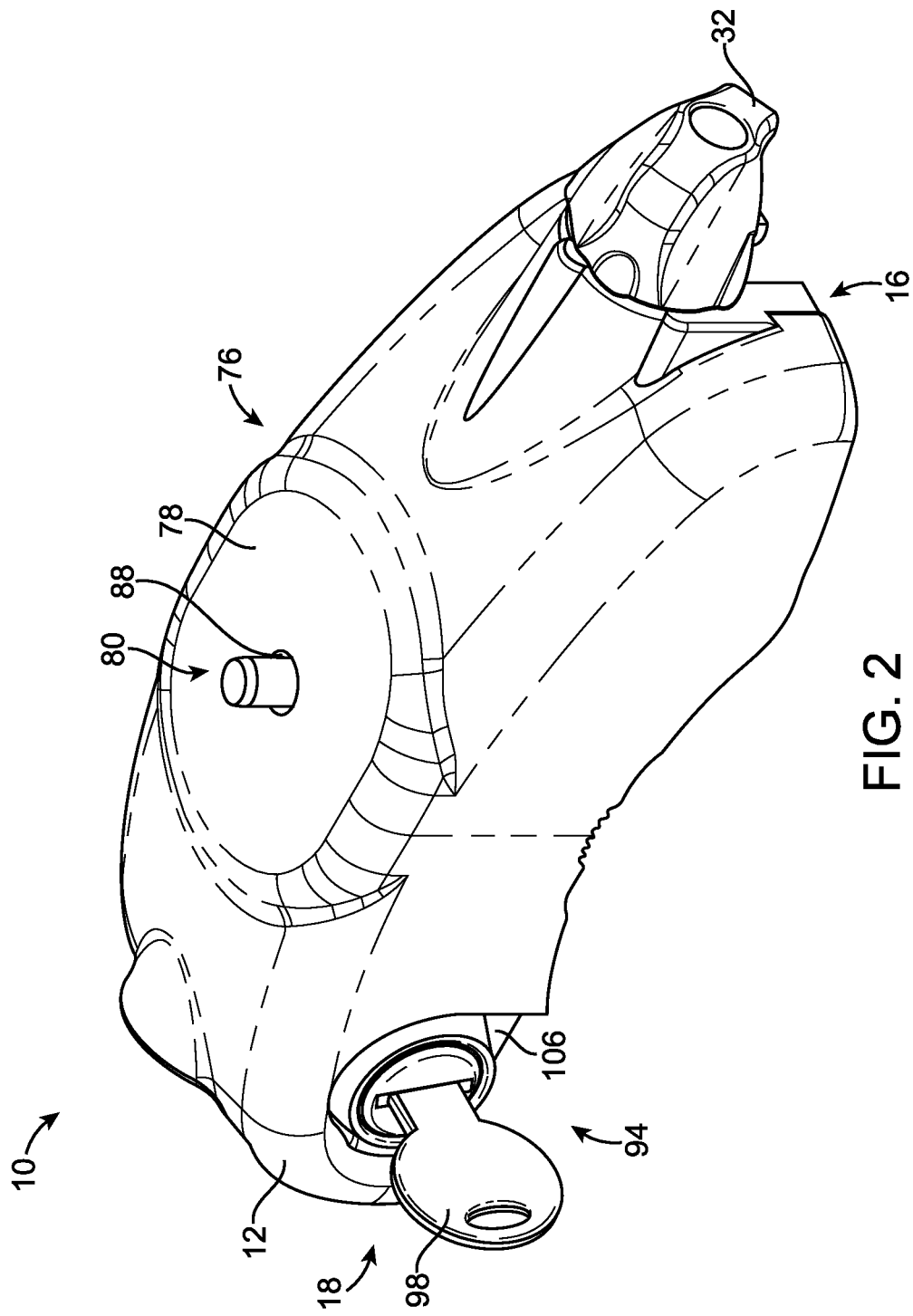

A lockable carrier mount 10 adapted for exchangeably mounting different articles to the load bar 200 of a vehicle-mounted carrier system can include a main body 12, an actuating mechanism 30, 46 and interference locking member 34, and a securement member 14. The actuating mechanism 30, 46 is configurable between locked and released configurations. The actuating mechanism 30, 46 can include a rotatable actuator 30 and a longitudinally movable member 46 operably coupled thereto. The rotatable actuator 30 can have a blocking portion 34 with at least one protrusion 110 extending radially further from a rotational axis of the actuator 30 than other parts of the blocking portion 34. While there may be more than one such protrusion 110, each of the protrusions 110 will typically, but not necessarily, have a maximum extension from the rotational axis that is approximately equal. In this manner multiple locked positions can be affected by a single blocking portion 34. The interference locking member 94 can be coupled to the main body and has engagement surface(s) 108, 109 for selectively engaging the blocking portion 34. The engagement surface 109 can engage or abut the protrusion in the locked configuration to prevent rotation of the actuator 30 relative to the locking member 94. The securement member can be operably coupled to the actuating mechanism and configured to move toward a secured configuration when the actuator is rotated in one direction and move toward a released configuration when the actuator is rotated in the opposite direction.

Figure 3:
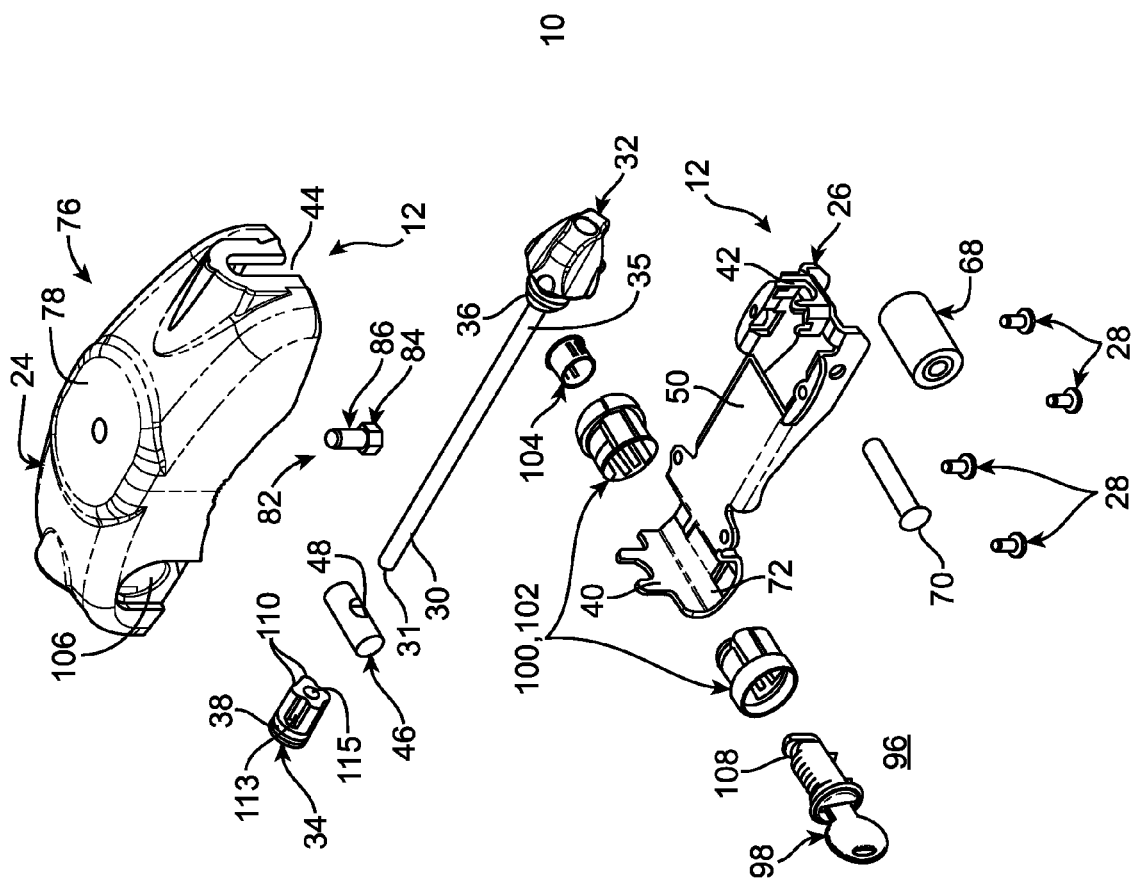
FIG. 3 is an exploded or assembly view of the carrier mount shown in FIGS. 1 and 2.
Figure 4:
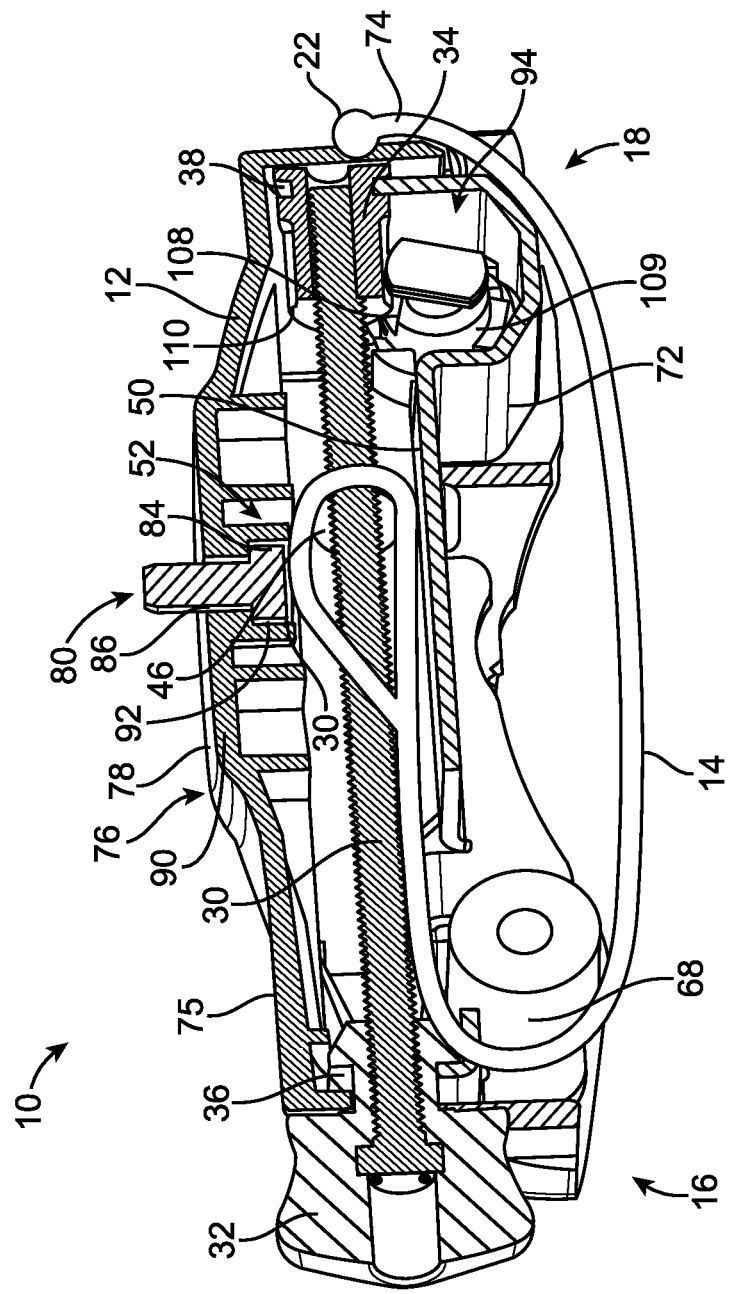
FIG. 4 is a section view, slightly rotated into a perspective orientation, of the carrier mount shown in FIGS. 1 and 2 (but rotated 180° about a vertical axis to reverse it left/right as compared to FIGS. 1 and 2)
Figure 5:
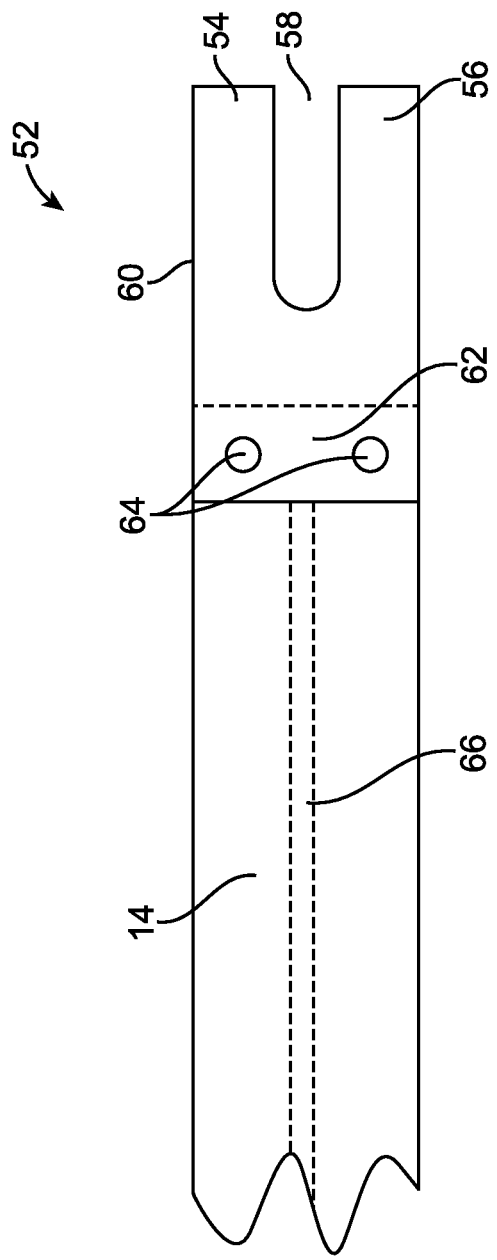
FIG. 5 is a plan view of an end of the strap shown in FIG. 4.

An embodiment of a carrier mount 10 according to the presently disclosed technology is illustrated in FIGS. 1-7. As illustrated, the carrier mount 10 has a body member or main body 12 and a securement or clamping member 14 {for example, but not limited to, a strap as shown in FIGS. 5 (partially), 6, and 7, and illustrated schematically in FIG. 4} that extends from one end of the body member 12, e.g., the knob end 16, to the other end of the body member 12, e.g., the lock end 18, below the body member 12. As best shown in FIGS. 1 and 5, there are a pair of inwardly facing, generally cup-shaped recesses 20 at the lock end 18 of the body member 12. A lug 22 protrudes from each of two sides of the securement member 14 at one end thereof, and in a secured configuration, each of the lugs are removably received within respective recesses 20 in the body member 12 thereby releasably securing the lug-end of the securement member 14 to the body member 12.

As best shown in FIG. 3, the body member 12 may include a generally shell-shaped upper member 24 and a generally co-extensive lower closure member 26, which may be attached to the upper member 24 by means of bolts or screws 28 to secure the various internal components within the body member 12. With respect to those various internal components, the body member 12 houses a centrally located, longitudinally extending rotatable member 30 (for example, a threaded rod as shown in FIGS. 3 and 4). While FIGS. 3 and 4 illustrate the rotatable member 30 as a threaded rod, those skilled in the art will appreciate that the rotatable member can be a threaded bolt, a threaded rotatable member, or any other structure that is capable of rotation within the body member 12 and capable of receiving a longitudinally movable member 46 configured to advance and retract along the longitudinal axis of the rotatable member 30, as will be described below.

A knob 32 is securely attached to the threaded rod 30 at one end 35 and a blocking member 34 is securely attached to the threaded rod 30 at the other end 31 as shown in FIGS. 3 and 4. For example, the blocking member 34 can be a cylindrical member forming an aperture 115 configured to receive the threaded rod 30. The knob 32 and the blocking member 34 each have a circumferential groove 36, 38, respectively, and into which edges of the walls of U-shaped cradle supports 40, 42 (provided on the lower closure member 26) fit to keep the threaded rod 30 in proper longitudinal position while supporting it and allowing it to rotate around its longitudinal or rotational axis. Additionally, edges of the walls of U-shaped opening 44 in the knob end of the upper member 24 fit within the circumferential groove 36 formed on the knob 32 to further assure that the threaded rod remains properly positioned.

A longitudinally movable "cinch-up" member 46 (e.g., a barrel nut as illustrated FIG. 3) is located within the body member 12 of the carrier mount 10. As illustrated in FIG. 3, the threaded rod 30 extends through the barrel nut 46 with the external threads on the threaded rod 30 engaging internal threads formed in the bore 48 of the barrel nut 46. The space in which the barrel nut 46 is located, which is bounded below by the smooth, sliding support surface 50 on the closure member 26, is somewhat confined and limits the extent to which barrel nut 46 can rotate (if any) around the longitudinal axis of the threaded rod 30. Therefore, turning the threaded rod 30 in one direction and the other about its longitudinal axis (e.g., using the knob 32 to do so) causes the barrel nut 46 to move back and forth (translate) along the threaded rod 30 to move longitudinally within the carrier mount 10.

Although FIG. 3 illustrates the longitudinally movable member 46 as a barrel nut having a threaded bore, those of ordinary skill in the art will appreciate that the longitudinally movable member 46 can be a bracket couplable to the rotatable member 30 and configurable to move along the longitudinal axis of the rotatable member as the rotatable member 30 is rotated. In other embodiments, the longitudinally movable member 46 can be a tension rod, a pin, a hooked member, or other longitudinally movable member that is couplable to a rotatable member such that rotation of the rotatable member causes movement of the longitudinally movable member along the longitudinal axis of the rotatable member and that is adapted to receive at least one securement member.

A securement or clamping member 14 can be coupled to the longitudinally movable member 46, as illustrated in FIG. 4. The securement member 14 can be configured to secure the carrier mount 10 to a load bar 200 (see FIG. 6). For example, the securement member 14 can be configured to partially wrap around the load bar 200. The securement member 14 can be coupled to the longitudinally movable member 46 such that advancement and retraction of the longitudinally movable member 46 cause movement or change in configuration of the securement member 14.

In the exemplary embodiment of FIG. 4, retraction (movement to the right) of the longitudinally movable member 46 along the longitudinal axis of the rotatable member 30 causes the securement member 14 to tighten around the load bar to which the carrier mount 10 is secured. Conversely, the advancement of the longitudinally movable member can cause the securement member 14 to loosen from abutting engagement with the load bar as depicted in FIG. 4. As those skilled in the art will appreciate, in an alternative configuration advancement (instead of retraction) of the longitudinally movable member 46 along the longitudinal axis of the rotatable member 30 can cause the securement member 14 to tighten to the load bar 200 to which the carrier mount 10 is to be secured. In this case, retraction of the longitudinally movable member will cause the securement member 14 to loosen away from the load bar 200. The securement member 14 can be a strap, a rigid clamping arm, more than one strap, a cable, a looped cable, a scissor-clamp, or any other securement or clamping arrangement that can be loosened or tightened to releasably secure a carrier mount 10 to a load bar 200 in response to lateral movement of a driver such as the illustrated barrel nut 46.

While the illustrated embodiments show one securement member 14, those skilled in the art will appreciate that more than one securement member 14 can be coupled to the rotatable member 30 and the longitudinally movable member 46. Those of ordinary skill in the art will also appreciate that in an embodiment having more than one securement member 14 or a plurality of securement members 14, each securement member 14 could be coupled to a respective longitudinally movable member 46 (or portion of one) or each respective longitudinally movable member 46 could be coupled to one rotatable member 30. In other embodiments, each securement member 14 can be coupled to a respective longitudinally movable member 46 and a respective rotatable member 30. Other configurations of the securement member 14, the longitudinally movable member 46, and the rotatable member 30 that permit the securement member 14 to tighten or loosen the carrier mount 10 to a load bar 200, in response to movements of the longitudinally movable member 46 caused by rotations of the rotational member, are considered within the scope of this disclosure.

FIG. 4 illustrates an exemplary embodiment of a carrier mount 10 in which the actuating or clamping mechanism (14, 30, 46) includes a rotatable member or actuator 30 that is a threaded rod, a longitudinally movable member 46 that is a barrel nut having a threaded bore, and a securement member 14 that is a strap. As illustrated schematically in FIG. 4, a fixed end 52 of the strap 14 is secured to the barrel nut 46. More particularly, the fixed or looped end 52 of the strap 14 can have two fingers 54, 56 that are separated from each other by a U-shaped space 58 (shown in FIG. 5), that gives the fixed end 52 of the strap 14 somewhat of a clevis-type configuration. Each of the fingers 54, 56 is formed into a loop, as shown in FIG. 4 (in this elevational side view, only one is visible). Suitably, the fixed end 52 of the strap 14, with its looped fingers 54, 56, is formed from thin, flexible sheet metal (e.g., steel) as a separate tail member 60 that is attached to the end 62 of the strap 14, for example, by means of rivets 64. If the strap 14 were constructed from material such as webbing, to prevent the strap 14 from being cut to remove the carrier mount 10 from the load bar to steal connected roof-mounted equipment, it is contemplated that the strap 14 can be suitably reinforced with a steel cable 66 embedded within it and running along its length. The loop formed by each of the fingers 54, 56 passes around one of the ends of the barrel nut 46 in close-fitting relationship, thus securely attaching the fixed end 52 of the strap to the barrel nut 46.

Furthermore, a cylinder 68 is provided at a lower location at the knob end 16 of the body member 12 and extends laterally across the body member 12, from one side to the other. The cylinder 68 is supported by a cylindrical pin 70 (FIG. 3) and is able to rotate relatively freely on it.

As further illustrated in FIG. 4, the strap 14 extends from the barrel nut 46 and passes out of the body member 12 at the knob end 16 of the body member 12. The strap 14 then wraps around the cylinder 68 and extends along the underside of the carrier mount 10 to the opposite, lock end 18, where it wraps around a lock housing 72 formed in the lower closure member 26 and extends back up along the lock end 18. The releasable end 74 of the strap 14 is secured at the lock end 18 of the body member 12 by virtue of the lugs 22 being positioned within the cup-shaped recesses 20.

It is contemplated that many articles, like snow skis, in order to be fixed to the carrier mount 10, will require a holder that directly engages and holds the article (skis in this instance), and which is adapted to be secured to the carrier mount 10 that in turn affects the interconnection upon one of the carrying vehicle's cross-bars. As shown in the various figures, an exemplary carrier mount 10 can include an upper, support pad 76 (also referred to as a landing or mounting pad) that is slightly raised relative to the surrounding body member structure and which is configured to receive such an article holder, or the article itself if the article is adapted for direct engagement with the mount 10. The support pad 76 suitably extends across the entire width of the body member 12 and longitudinally by at least as much distance, if not slightly more. In at least one embodiment, the support pad 76 is disposed at an upper portion 75 of the body member 12. The top, support surface 78 of the support pad 76 is suitably flat, as shown, to form a support surface that provides maximal contact or support area for stability.

A mounting post 80 extends upwardly from the support surface 78. Suitably, the mounting post 80 is provided by means of a bolt or cap screw 82 having a head 84 that is polygonal (e.g., hexagonal or square). The threaded shank 86 of the bolt or cap screw 82 passes upwardly through an aperture 88 extending through the upper wall 90 of the support pad 76, and the head 84 of the bolt or cap screw 82 fits within a receiving socket 92 that has the same polygonal shape as the head 84 to prevent the bolt or cap screw 82 from rotating about its longitudinal axis. Suitably, the socket 92 receives the head 84 of the bolt or cap screw 82 with a press fit so that the bolt or cap screw 82 holds itself in position with the threaded shank 86 extending upwardly through the aperture 88 even when nothing is secured to or around the threaded shank 86.

This mounting post configuration lends itself to attaching a variety of equipment-specific carriers (or articles themselves) to the carrier mount 10. If the equipment-specific carrier (not shown) has a relatively thin attachment plate with a hole in it, the hole can be placed over the mounting post 80 and the equipment-specific carrier can be secured to the carrier mount 10 by screwing a nut down onto the support post 80. If, on the other hand, the equipment-specific carrier has an internally threaded socket, the equipment-specific carrier can be secured to the carrier mount 10 by locating the internally threaded socket over the support post 80 and rotating the equipment-specific carrier, per se, to screw it down onto the carrier mount 10.

To prevent the carrier mount 10 from being removed from the load bar without authorization and hence to prevent the equipment that is being transported from being stolen, the carrier mount 10 has a locking mechanism that includes a locking assembly 94 and the blocking member 34. The locking assembly 94 suitably includes: a lock cylinder 96 that is operated by a key 98; lock casing halves 100, 102; and lock end cap 104, as best shown in FIG. 3. The locking assembly 94 fits within lock housing 72 formed by the lower, closure member 26, and it is retained in place by the shell-shaped upper member 24. The key-end of the lock cylinder 96, with lock casing half 100 disposed over it, extends into lock access aperture 106 formed in the side of the upper member 24, so that the lock cylinder can be accessed to lock or unlock the carrier mount 10.

As shown in FIGS. 3 and 4, the end of the lock cylinder 96 that is opposite to the key-end has a flatted side surface 108. This flatted side surface 108 works in cooperation with the blocking member 34 on the one end of the threaded rod 30 to secure the carrier mount 10 in place or to permit it to be repositioned or removed. More particularly, the blocking member 34, which is generally cylindrical, has several ridges or protrusions 110 (e.g., three or four, as shown) extending along its side surfaces. For example, the ridges 110 can extend along the exterior surface of a side of the cylindrical blocking member 34. The blocking member 34 can also include at least one valley 113. In the exemplary embodiment illustrated in FIG. 3, the blocking member 34 includes a plurality of valleys 113, and each valley 113 is disposed between two adjacent ridges 110. When the lock cylinder 96 is in a first position (for example, a locked position), the non-flatted side surfaces 109 of the lock cylinder 96 will interfere with the ridges or protrusions 110 on the blocking member 34, thus preventing the threaded rod 30 from turning along its longitudinal axis and hence preventing the strap 14 from being loosened to reposition or remove the carrier mount 10 from the load bar.

In the exemplary embodiment illustrated in FIG. 3, a valley 113 of the plurality of valleys 113 can receive the non-flatted surface 109 of the lock cylinder 96, and as the rotatable member 30 attempts to rotate (which thereby attempts to rotate the blocking member 34), the ridge 110 adjacent to the valley 113 which has received the non-flatted surface 109 will interfere with the non-flatted surface 109 thereby preventing the rotation of the blocking member 34, and hence preventing the rotation of the rotatable member 30. On the other hand, when the lock cylinder 96 is in a second position (for example, an unlocked position), the flatted side surface 108 allows the ridges or protrusions 110 to move past it as the threaded rod 30 turns about its longitudinal axes.

Other locking assembly configurations that prevent the threaded rod 30 from being turned are possible. For example, a push-button-type of lock could be used to extend a blocking element into blocking relationship with the blocking member 34 and to withdraw the blocking element. Alternatively, instead of a separate blocking member 34, a transverse hole could be provided through the threaded rod 30, and a blocking element (e.g., a pin) could move into or out of the transverse hole to lock and unlock the carrier mount 10, respectively.

Figure 6:
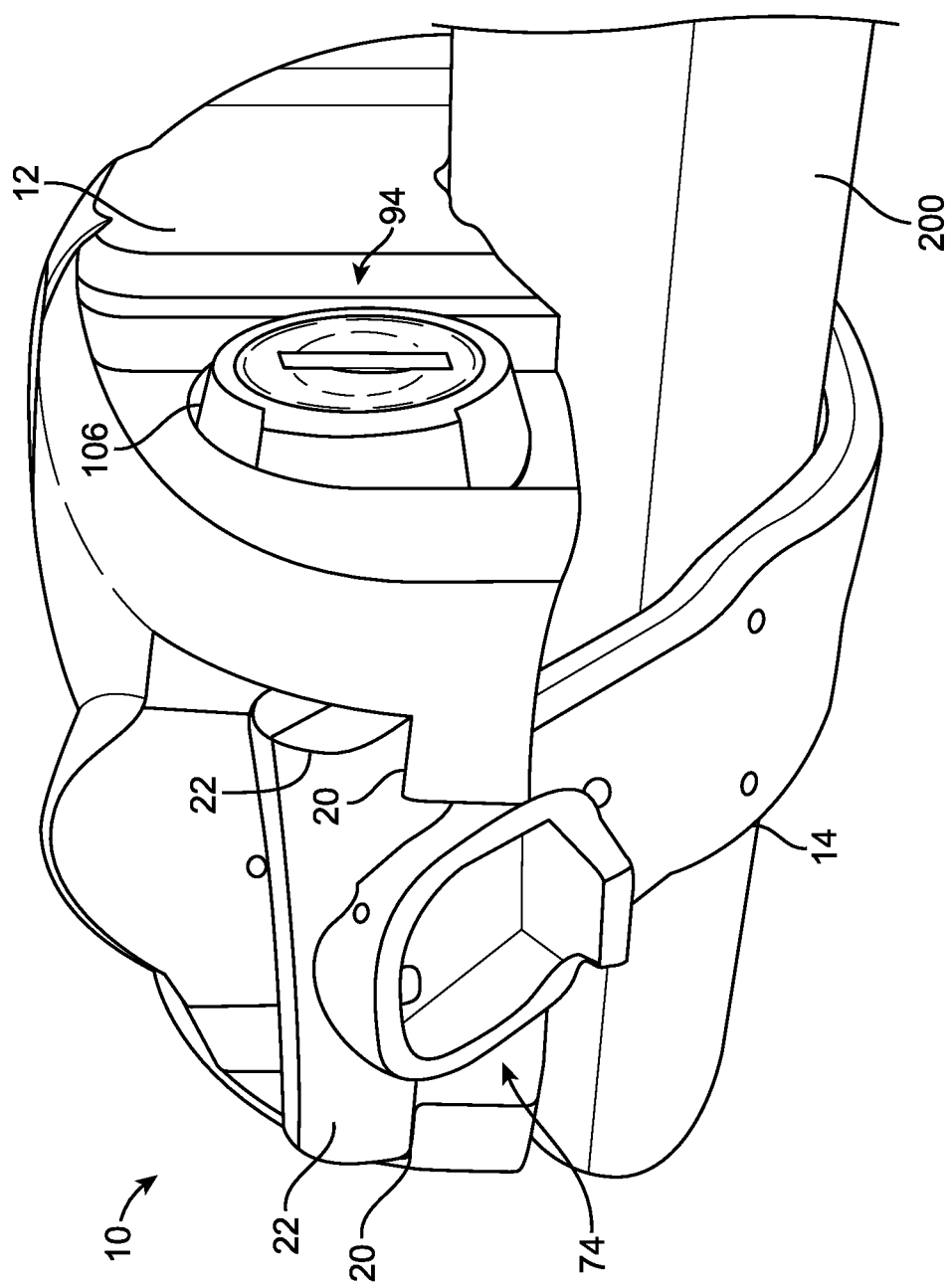
FIGS. 6 and 7 are end views, each rotated slightly into a perspective orientation, showing the carrier mount illustrated in FIGS. 1 and 2 secured to a load bar.
Figure 7:
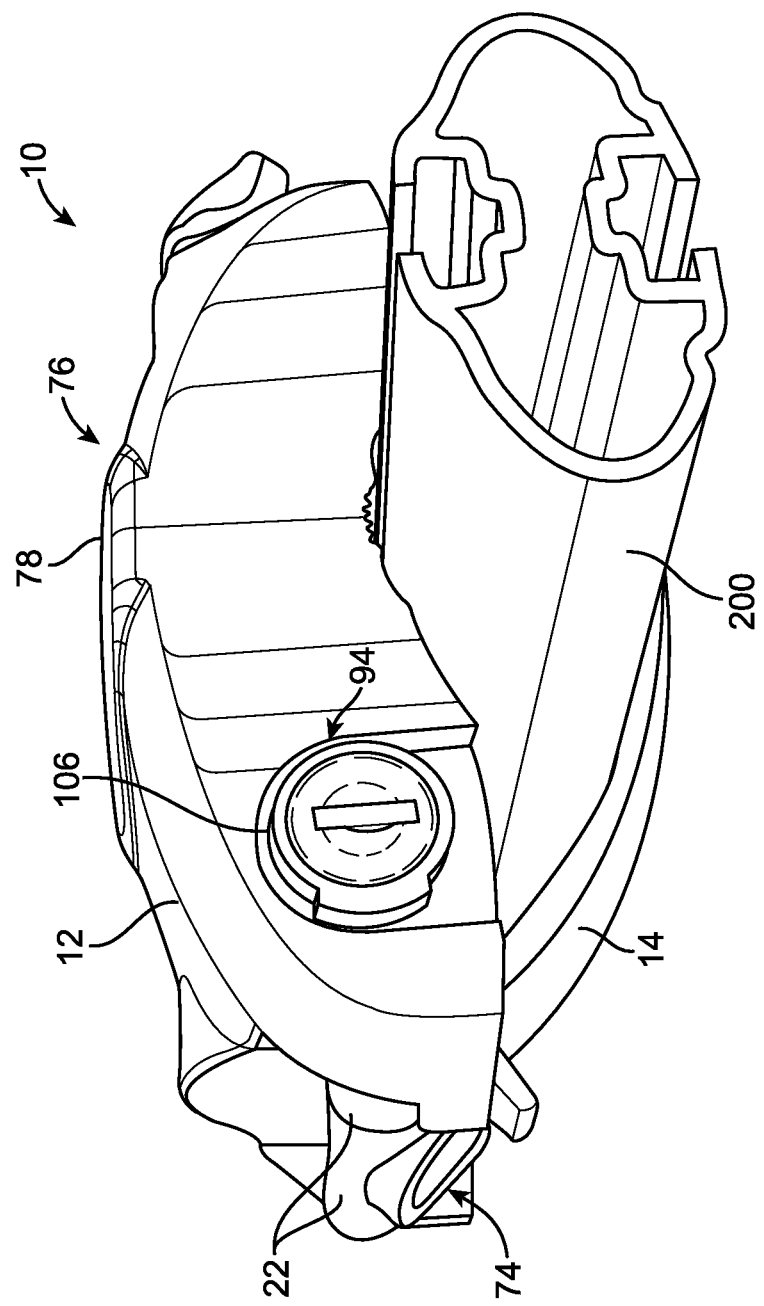

Thus, the carrier mount 10 may be mounted to a load bar 200 (e.g., as shown in FIGS. 6 and 7) by placing the body member 12 on top of the load bar with the strap 14 unsecured and hanging freely, then passing the releasable end 74 of the strap 14 beneath the load bar 200 and placing the lugs 22 into the recesses 20. The carrier mount 10 is then secured to the load bar by turning the knob 32, and hence the threaded rod 30, in the appropriate direction to cause the barrel nut 46 to move away from the knob 32 (i.e., toward the right in FIG. 4), which takes up any slack in the strap 14 to cinch the carrier mount 10 firmly to the load bar. The carrier mount 10 is then secured in position simply by turning the lock cylinder 96 in the appropriate direction, using the key 98. Conversely, the carrier mount 10 may be removed from the load bar, or simply repositioned along it, by unlocking the locking assembly 94 then turning the knob 32 in the opposite direction to create slack in the strap 14. The carrier mount 10 can then be moved along the length of the load bar 200 to reposition it. Additionally, the lugs 22 can then be removed from the recesses 20 to release the releasable end 74 of the strap 14 if it is desired to completely remove the carrier mount 10 from the load bar 200.

Exemplary implementations have been described hereinabove regarding a carrier mount. While specific, exemplary embodiments have been shown and described, various modifications to and/or departures from the disclosed embodiments will occur to those having skill in the art. One of ordinary skill in the art will also appreciate that the elements and features described and illustrated in the figures herein can be optionally included to achieve the benefits of the presently disclosed carrier mount. Additionally, those skilled in the art will appreciate that features in each of the figures described herein can be combined with one another and arranged to achieve the described benefits of the presently disclosed carrier mount. Various modifications to and departures from the disclosed implementations will occur to those having skill in the art. The subject matter that it is desired to be protected is set forth in the following claims.

We claim:

1. A lockable carrier mount for securing articles to a vehicle's load bar, the carrier mount comprising:
   a main body;
   an actuating mechanism coupled to and housed at least partially within the main body, the actuating mechanism being configurable between locked and released configurations;
   the actuating mechanism having a rotatable actuator that includes a blocking portion having at least one protrusion that extends radially further from a rotational axis of the actuator than other parts of the blocking portion;
   an interference locking member coupled to the main body and having an engagement surface that selectively engages the blocking portion;
   the engagement surface engaging one of the protrusions in a locked configuration and preventing rotation of the actuator relative to the locking member; and
   a securement member operably coupled to the actuating mechanism that progresses toward a secured configuration as the actuator is rotated in one direction and progresses toward a released configuration as the actuator is rotated in an opposite direction.

2. The carrier mount as recited in claim 1, wherein the main body is configured to exchangeably receive different articles to be mounted to a carrying vehicle's load bar, the main body comprising a mounting pad having a substantially flat engagement surface that abuts a complimentary surface on each of the different articles to be exchangeably received thereupon.

3. The carrier mount as recited in claim 1, wherein the rotatable actuator comprises:
   a threaded rotatable member extending longitudinally through the main body; and
   a barrel nut having a threaded bore engaged by the threaded rotatable member and coupled to the securement member so that the securement member progresses toward the secured configuration when the actuator is rotated in one direction and progresses toward the released configuration when the actuator is rotated in an opposite direction.

4. The carrier mount as recited in claim 1, wherein the securement member is a strap.

5. The carrier mount as recited in claim 1, wherein the securement member comprises a plurality of straps oriented substantially parallel, one to the others, in the secured configuration.

6. The carrier mount as recited in claim 1, wherein the securement member is a rigid clamping member operably coupled to the actuating mechanism, the clamping member configurable between the released configuration and the secured configuration in which the clamping member abuttingly engages the load bar of the vehicle.

7. The carrier mount as recited in claim 1, wherein the interference locking member further comprises a lock cylinder having a flatted side surface and a non-flatted side surface, wherein the lock cylinder is rotatable into the locked configuration.

8. The carrier mount as recited in claim 1, wherein the blocking portion is a cylindrical member and the at least one protrusion is a ridge extending along an exterior surface of the cylindrical member.

9. The carrier mount as recited in claim 2, wherein the mounting pad further comprises a threaded mounting post extending upwardly from the substantially flat engagement surface.

10. The carrier mount as recited in claim 1, further comprising a knob mounted on an end of the actuator, the knob being located outside the main body whereby the actuator is manually operable.

11. A method for assembling a carrier mount comprising a main body, and a rotatable actuator, a longitudinally movable member, and a blocking portion and an interference locking member configured to prevent rotation of the actuator relative to the locking member, the method comprising:
    positioning the rotatable actuator within the main body such that the actuator extends longitudinally into the main body;
    coupling the longitudinally movable member to the rotatable actuator such that rotation of the rotatable actuator advances and retracts the longitudinally movable member along the rotational axis of the actuator in dependence upon the direction of rotation;
    securing the blocking portion to an end of the actuator; and
    coupling the locking member to the main body such that an engagement surface of the locking member is arranged to selectively engage the blocking portion in the locked configuration, wherein in the locked configuration, the engagement surface abuts the blocking portion, thereby preventing rotation of the actuator relative to the locking member.

12. The method as recited in claim 11, further comprising attaching a securement member to the longitudinally movable member so that advancement of the longitudinally movable member causes the securement member to secure upon a load bar of a carrying vehicle.

13. The method as recited in claim 11, further comprising attaching a securement member to the longitudinally movable member so that retraction of the longitudinally movable member causes the securement member to secure upon a load bar of a carrying vehicle.

14. The method as recited in claim 11, further comprising interconnecting a rigid clamping member to the longitudinally movable member.

15. The method as recited in claim 11, further comprising attaching at least two portions of a securement member to the longitudinally movable member.

16. The method as recited in claim 11, further comprising coupling a knob to the actuator so that the knob is exposed for manual user manipulation.

17. The method as recited in claim 11, wherein the actuator is a threaded rod and the longitudinally movable member is a barrel nut having a threaded bore, and wherein securing the longitudinally movable member comprises inserting the threaded rod through the threaded bore, such that rotations of the threaded rod cause the barrel nut to advance and retract along the threaded rod in dependence upon the direction of rotation.

* * * * *